US 6,669,105 B2
Bryan et al.
Dec. 30, 2003

(12) United States Patent
(10) Patent No.: US 6,669,105 B2
(45) Date of Patent: Dec. 30, 2003

(54) CLOSED-LOOP MOSQUITO INSECTICIDE DELIVERY SYSTEM AND METHOD

(75) Inventors: Avron L. Bryan, Cocoa Beach, FL (US); Larry D. Heller, Osteen, FL (US)

(73) Assignee: Adapco, Inc., Sanford, FL (US)

( * ) Notice: Subject to any disclaimer, the term of this patent is extended or adjusted under 35 U.S.C. 154(b) by 188 days.

(21) Appl. No.: 09/952,389

(22) Filed: Sep. 12, 2001

(65) Prior Publication Data

US 2002/0030117 A1 Mar. 14, 2002

Related U.S. Application Data

(60) Provisional application No. 60/232,214, filed on Sep. 13, 2000.

(51) Int. Cl.[7] ............................ B05B 7/00; A01G 25/00; A01G 27/00; A62C 5/02; A62C 5/00
(52) U.S. Cl. ........................ 239/61; 239/63; 239/69; 239/310; 239/311
(58) Field of Search ................................ 239/61, 63, 64, 239/67, 68, 69, 310, 311, 366, 368, 369, 398, 407, 75, 100, 737

(56) References Cited

U.S. PATENT DOCUMENTS

| | | |
|---|---|---|
| 2,599,465 A | 6/1952 | Letvin et al. |
| 2,813,490 A | 10/1957 | Parke et al. |
| 3,552,652 A | 1/1971 | Greenwood |
| 3,666,177 A | 5/1972 | Mencacci |
| 3,702,306 A | 11/1972 | Waldron |
| 3,877,645 A | 4/1975 | Oligschlaeger |
| 3,917,168 A | 11/1975 | Tenney |
| 3,982,351 A | 9/1976 | Waldron |
| 4,050,629 A | 9/1977 | Query et al. |
| 4,052,003 A | 10/1977 | Steffen |
| 4,111,364 A | 9/1978 | Schroeder |
| 4,121,767 A | 10/1978 | Jensen |
| 4,182,492 A | 1/1980 | Parke et al. |
| 4,288,036 A | 9/1981 | Jubinville |

(List continued on next page.)

FOREIGN PATENT DOCUMENTS

WO    WO 01/52453    7/2001

*Primary Examiner*—Davis Hwu
(74) *Attorney, Agent, or Firm*—Allen, Dyer, Doppelt, Milbrath & Gilchrist, P.A.

(57) ABSTRACT

A mobile, real-time, closed-loop system and method for delivering an aerosol insecticide spray to a treatment area during a treatment period of time employs a prime mover having a spray nozzle through which an air volume is produced in order to entrain insecticide as particles in an airstream passing out of the nozzle. A particle size detector, weather centers and an electronic controller are used to regulate the amount of insecticide and particle size dependent upon speed of the prime mover and weather conditions at the treatment area.

26 Claims, 4 Drawing Sheets

U.S. PATENT DOCUMENTS

| | | | |
|---|---|---|---|
| 4,315,317 A | 2/1982 | Orchard et al. | |
| 4,553,702 A | 11/1985 | Coffee et al. | |
| 4,630,773 A | 12/1986 | Ortlip | |
| 4,713,241 A * | 12/1987 | Wakisaka et al. | 424/93.461 |
| 4,842,221 A | 6/1989 | Beach et al. | |
| 4,992,206 A | 2/1991 | Waldron | |
| 4,995,572 A | 2/1991 | Piasecki | |
| 5,160,664 A | 11/1992 | Liu | |
| 5,334,987 A | 8/1994 | Teach | |
| 5,390,040 A | 2/1995 | Mayeux | |
| RE35,100 E | 11/1995 | Monson et al. | |
| 5,499,198 A | 3/1996 | Gaidos et al. | |
| 5,563,389 A | 10/1996 | Marin et al. | |
| 5,574,657 A | 11/1996 | Tofte et al. | |
| 5,590,921 A | 1/1997 | Holtman et al. | |
| 5,704,546 A | 1/1998 | Henderson et al. | |
| 5,870,686 A | 2/1999 | Monson | |
| 5,909,299 A | 6/1999 | Sheldon, Jr. et al. | |
| 6,010,093 A | 1/2000 | Paulson | |
| 6,015,773 A * | 1/2000 | Wysong et al. | 504/360 |
| 6,087,984 A | 7/2000 | Keller et al. | |
| 6,105,878 A | 8/2000 | Robinson et al. | |
| 6,243,649 B1 | 6/2001 | Wetherbee et al. | |
| 6,266,595 B1 | 7/2001 | Greatline et al. | |
| 6,353,409 B1 | 3/2002 | Keller et al. | |
| 6,424,295 B1 | 7/2002 | Lange | |
| 2002/0167702 A1 | 11/2002 | Badesha et al. | |

* cited by examiner

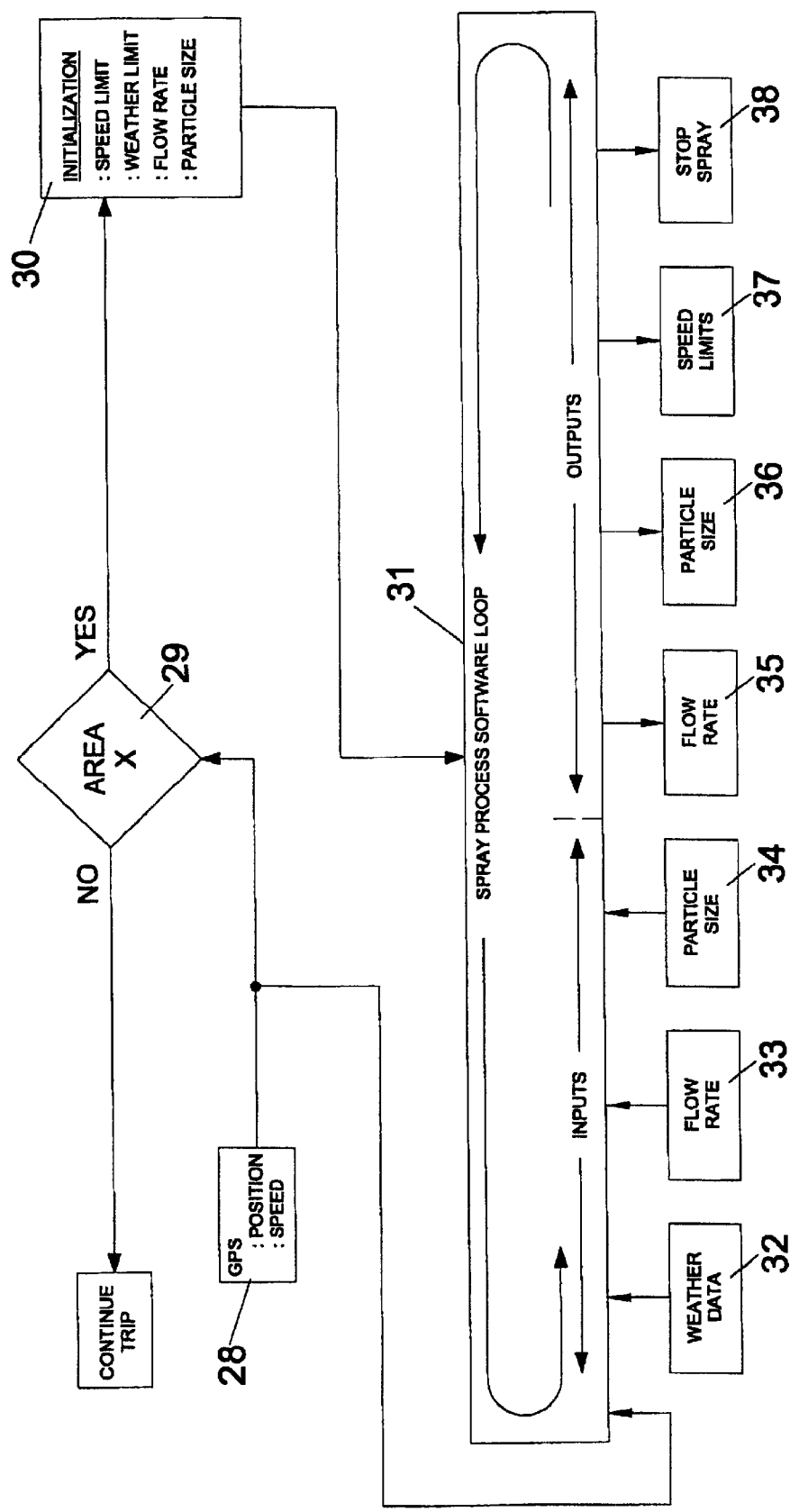

CLOSED-LOOP MOSQUITO INSECTICIDE DELIVERY SYSTEM AND METHOD

CROSS-REFERENCE TO RELATED APPLICATIONS

This application incorporates by reference and claims priority to commonly owned Provisional Application Ser. No. 60/232,214, for "An Effective Mosquito Insecticide Delivery System and Method," having a filing date of Sep. 13, 2000.

BACKGROUND

This invention relates to insect control through the application of insecticide and, particularly, to an improved system and method for applying insecticide from a vehicle to more accurately, safely and cost-effectively eradicate mosquitoes in both rural and city environments.

DESCRIPTION OF THE PRIOR ART

Prior to 1990, open-loop, electronic-based fluid flow rate control was available to the mosquito control industry. The earliest device of this type was the "PRO-FLO," a proportional flow rate pump controller invented by H. Starr (deceased). Currently available mosquito insecticide delivery systems utilize aerosol (i.e., fog) generators mounted on a prime mover, such as a truck or other vehicle, to enable spraying to specifically selected sites in rural and city environments. The majority of these systems typically employ a small gas motor, a blower unit for generation of an air flow, a supply tank for the insecticide and a nozzle assembly which mixes the insecticide chemical with the blower-directed air in order to disperse the insecticide as micron size insecticide fog particles. Recently, a different class of aerosol generators have become available which use electrical power to generate the insecticide fog. While the spray results for electrical power generators are similar to the gas powered spray systems, they are significantly quieter during spraying.

Often, the ground vehicle spraying systems are used together with insecticide spraying via aircraft as part of a comprehensive program to eradicate mosquitoes.

Since mosquito bites can lead to very serious infections (malaria, dengue fever and encephalitis), the requirement for ground vehicle mosquito eradication programs will continue indefinitely. Further, the increase in the average temperature in both the winter and summer months (due to $CO_2$ and other greenhouse gases) will steadily increase both the areas and time periods each year when mosquito eradication programs will be required. A recent example of this increased need for a mosquito eradication program occurred during 1999 in New York City. Mosquito bites resulted in several cases of encephalitis and consequentially a new comprehensive and continuing mosquito eradication program has been implemented for that city.

One major problem associated with presently available ground vehicle mosquito spray systems is that the weather conditions locally at the vehicle are not automatically considered in the spray process. At present, the vehicle operator must decide whether to stop or continue the spray process if obvious weather problems such as heavy rain exist. However, the vehicle driver in an enclosed air-conditioned vehicle cab may not be aware of other adverse weather conditions such as wind speed and direction. For example, if the wind on a city street is blowing at 90 degrees to the direction of vehicle travel, then one side of the street will receive more insecticide concentration and the opposite side of the street will receive less than planned. Further, particular weather conditions at a spray vehicle may mean that the spraying must fully stop or that the vehicle must travel in a different direction than planned to achieve a desirable spray application in a particular area.

Unfortunately, the information on weather related discrepancies in spray coverage are not presently available to management. Therefore, no corrective action can be taken for the level of insecticide concentration varying widely over a spray process. In addition, the humidity level and the ground temperature at the vehicle also impact the fog distribution process. These two variables along with wind and vehicle velocity should also be considered continuously to optimize the spraying process. The control interaction with these complex variables during a spray operation requires an electronic recorder and controller system with the capability to both process intelligent spray control algorithms and record and utilize real-time weather information. Effective spray systems with these capabilities have not previously been available.

Such intelligent spray control algorithms are also dependent upon accurate knowledge of the vehicle geographical position. For example, the decision to spray at a certain concentration (or not spray at all) may depend upon geographical information such as (a) the location of insecticide sensitive individuals or animals in the planned spray area, and/or (b) the location of areas which have a high potential for mosquitoes such as a stagnant pond. Fortunately, the required accurate geographical knowledge is now universally available to all vehicles in real-time and at low cost to the electronic recorder and controller system via inputs from the U.S. Global Positioning Satellite System (GPS).

Another major problem with presently available aerosol generators is the difficulty of both generating and verifying the desired droplet size of the insecticide. A desired particle size must be maintained while providing varying fluid flow rates, which are required in order to maintain the same concentration of insecticide as the vehicle varies its speed while spraying. The droplet size for a particular chemical and the maximum application rate per unit area are determined from regulations by the U.S. Environmental Protection Agency and/or state and local governments. The regulations for droplet size are based upon conflicting requirements of the effect of the insecticide upon the general environment and the need for a maximum effective kill rate for the insecticide. The optimum particle size will vary for a particular chemical, for a particular location and for weather conditions, as well as the type of target mosquito.

The presently available spray technology assumes that the desired particle size can be generated by varying the air pressure applied to the nozzle against a measured fluid flow rate. This technique requires a series of calibrations of particle size versus air pressure and fluid flow rate for each insecticide type. This control of air pressure applied to the nozzle for mosquito eradication is implemented in the mosquito control industry by two prior art methods, the most common of which is a one-point calibration of a fixed air pressure setting versus a fixed flow rate for a particular chemical. This technique is an open-loop control process that produces a desired particle size only at a fixed fluid flow rate and at the related vehicle speed. As the vehicle speed varies during a spray application, the particle sizes may vary widely from the particle size specified in government regulations. The second method requires the addition of an air pressure sensor, a pressure regulator valve and a controller to maintain a desired air pressure relative to the vehicle speed and the fluid flow rate. While requiring more equipment and extensive calibrations, this method is still an open loop approach as the particle size can vary during a spray process and not be detected. An example of this method is disclosed in U.S. Pat. No. 5,248,448 to Waldron et al.

For electrically powered spray systems of the type described above, the particle size is generated by the rotation rate of a porous cylinder block located on the rotating shaft. Changes in the particle size is accomplished by varying the rotation rate of the shaft. This technique is still an open loop control system for particle size.

In order to correct these serious problems in vehicle mosquito spray systems, there is a need for a new system and method which:

(1) Continuously maintains the optimum mosquito insecticide droplet size and application rate;
(2) Continuously includes the weather conditions at the vehicle as part of the spray control process;
(3) Continuously includes the geographical position of the vehicle as part of the spray control process;
(4) Accepts programmable spray process instructions and provides detailed spray process reports including the concentration of insecticides applied at any time and/or at a geographical position; and
(5) Is flexible in design so as to be adaptable for controlling insecticide particle size and recording data based upon other criteria.

The present invention is directed to a system and method which provides these and other features.

SUMMARY OF THE INVENTION

A primary objective of this invention is to provide an improved ground vehicle mosquito insecticide spray system and method which ensures that the desired spray flow rate at the optimum particle size is effectively applied to the selected area.

Another object of this invention is to provide an insecticide delivery system and method which utilizes a closed loop control approach based upon direct, real-time measurement of the insecticide particle size being delivered by the sprayer.

It is another object of the present invention to provide a system and method which supplies detailed reports on the estimated spray application concentrations for all geographical locations that have been exposed to insecticide spraying.

It is another object of the invention to provide real-time insecticide particle size measurement data to a Sprayer Recorder and Controller (SRC) unit so that real-time control of the particle size can be achieved.

It is another object of the invention to use a system and method which provides local weather information (wind velocity, humidity and temperature for example) automatically to the vehicle SRC so that this information can be used in real-time in the spray control process. This information is also be reported as part of the process of accessing the viability of a particular insecticide at a specific location.

It is another object of the invention for the SRC to accept geographical position information and related instructions so that real-time control of the spray process in selected geographical positions is automatically achieved.

BRIEF DESCRIPTION OF THE DRAWINGS

FIG. 4 is a logic flow diagram illustrating various logic inputs and outputs for the Spray Recorder and Control (SRC).

DESCRIPTION OF THE PREFERRED EMBODIMENT

It will be understood by those skilled in the art that the present invention is not limited in its application to the details of the particular arrangement shown here since the invention is capable of other modifications and embodiments. The terminology used herein is for the purpose of description and not of limitation.

Figure 1:
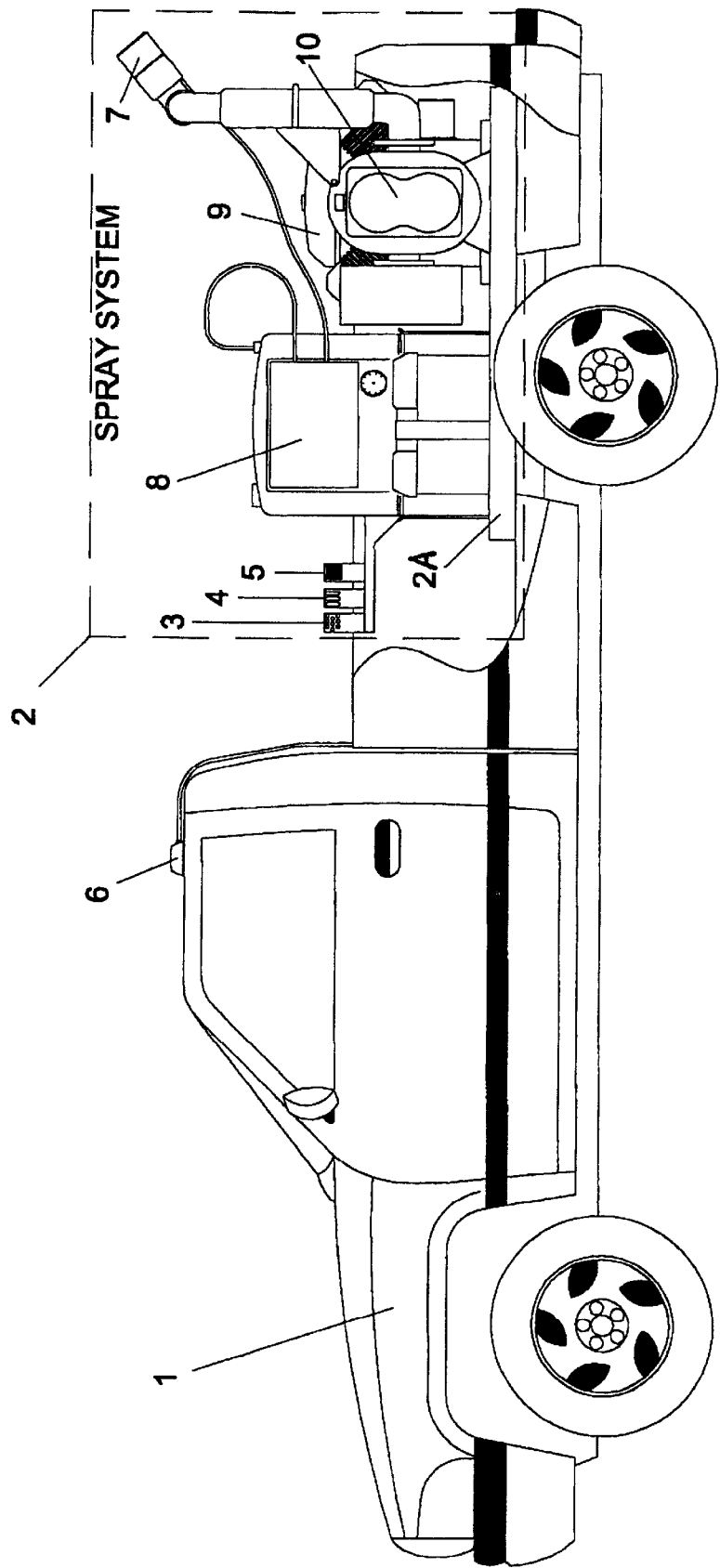
FIG. 1 is a side view of a typical vehicle with the spray system of the present invention mounted on the vehicle with weather sensors, GPS antenna and other components of the system also shown.

FIG. 1 is a view of a typical vehicle 1 with a spray system 2 mounted on the vehicle. The spray system 2 is mounted on skid 2A for easy installation and removal. Weather sensors are mounted on the vehicle are temperature sensor 3, wind velocity sensor 4, and humidity sensor 5. Also shown on the top of the vehicle 1 is Global Position System (GPS) antenna 6 (a component of the spray system 2).

Weather sensors 3, 4, 5 and GPS antenna 6 are powered by spray system 2. All signal and power cabling from spray system 2 to antenna 6 and weather sensors 3, 4, 5 are weatherproof and are independent of the wiring of vehicle 1, thereby allowing easy installation and removal on any type of prime mover used for spraying.

Also shown on FIG. 1 are other components of the spray system 2. These are spray nozzle 7, SRC 8, motor 9, blower 10, air volume control 15, shaft 16 and piping 17.

Figure 2:
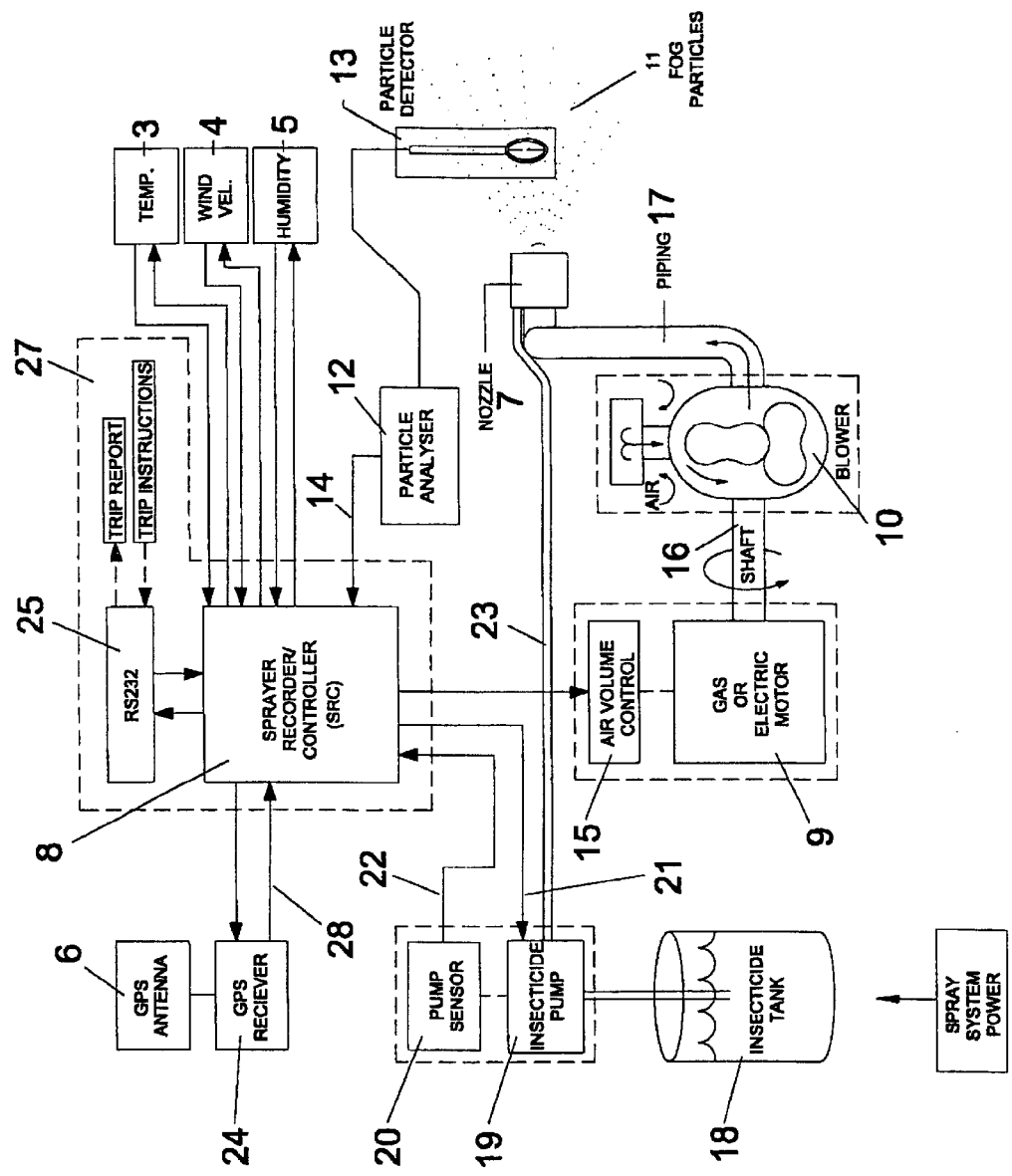
FIG. 2 is a block diagram of the spray system of the present invention, including a novel Spray Recorder and Control (SRC) unit in which closed loop control of the spray process is achieved while considering vehicle speed, fluid flow rate, insecticide particle size, weather and geographical position.

FIG. 2 is a block diagram of a preferred form of spray system 2, including SRC 8.

Referring to FIG. 2, particle size measurement is achieved by directly measuring the size of insecticide particles 11 in real-time at the output of nozzle 7. To achieve this measurement, particle analyzer 12 is provided, having detector 13 directly exposed to the flow of insecticide particles 11. Particle analyzer 12 provides the measured particle size to SRC 8 (upon command) over RS232 cable 14.

Real-time closed loop control of the size of particles 11 is then achieved by SRC 8 by comparing the particle size as measured by analyzer 12 against a desired particle size by SRC 8, in part, from predetermined criteria provided by reference to applicable regulations and/or manufacturer's specifications, and then, if necessary, changing the level of an electrical signal to air volume control 15 via control input 15A. In response to the change in the electrical level on input 15A to air volume control 15, prime mover 9 increases or decreases the rotation rate of shaft 16. This change in turn modifies the volume of air generated by blower 10 and applied via piping 17 to nozzle 7. This increase or decrease of air volume to nozzle 7 directly changes the size of insecticide particles 11 and the insecticide fluid being supplied to the nozzle 7 from insecticide tank 18 via fluid pump 19 and fluid rate sensor 20.

Nozzle 7 may, for example, be in accordance with the design shown in U.S. Pat. No. 5,232,164 to Resch. Nozzles of this type generate a desired particle size by controlling the volume of air applied to nozzle. A second order control not required over the range of mosquito insecticide particles is to maintain the depth of liquid film on the nozzle surfaces. The optimum particle size may also be controlled without the measurement and control of the air pressure at the spray nozzle.

For electrically powered spray systems of the type discussed above, the real-time closed loop control of the particle size is achieved by varying the rotation rate of the shaft on which the porous cylinder is mounted. The loop is then closed by the measurement of the particle size, which is then supplied to SRC 8.

Real-time particle size measurement is utilized as the primary variable in the control loop to ensure that the spray system 2 does not emit an insecticide particle size 11 that may be a danger to the environment and to reduce insecticide waste from a particle size 11 that does not provide the maximum mosquito kill. The use of a primary variable for closed loop control normally provides a more cost efficient and reliable system and method. Refer to U.S. Pat. Nos. 5,667,558 and 5,667,651 to Bryan for a recent example of the benefit of using the primary system output for closed loop control. In the systems disclosed in these patents, the cost of chemicals in wastewater scrubber applications has been reduced by approximately 50%. This is accomplished by measuring and controlling the level of $H_2S$ gas (the system output) rather than the indirect variable, the level of pH in the scrubber sump. These patents, both of which are incorporated here by reference, are now in extensive use in the U.S. wastewater industry.

Referring again to FIG. 2, the desired insecticide fluid flow rate to be applied to nozzle 7 is achieved by a second closed loop subsystem. The SRC 8 calculates the desired flow rate from the vehicle speed, vehicle geographical position determined from GPS antenna 6, and the desired insecticide concentration at these position and weather conditions determined from temperature sensor 3, wind velocity sensor 4 and humidity sensor 5. The SRC 8 then turns on pump 19 via cable 21 to force insecticide in tank 18 to nozzle 7. The insecticide fluid flow rate is detected by pump rate sensor 20 and passed to the SRC 8 via cable 22. SRC 8 controls this flow rate loop independently of the size of particles 11. This is achieved because the conversion of fluid 18 to particles 11 is almost independent of air volume changes required for particle size control.

Referring again to FIG. 2, SRC 8 continuously receives data from weather sensors 3, 4 and 5. The weather sensor information is continuously related by the SRC 8 to previously programmed management decisions on the weather limits for the spray process. Specifically, the decision for stopping or continuing the spray process is not totally dependent upon a judgment of weather factors by the operator of vehicle 1.

Information from temperature sensor 3 enables the spray system 2 to respond to a particular insecticide suggested requirement (normally provided by the chemical manufacturer) for only spraying within certain temperature limits. Humidity sensor 4 enables a spray operation that may proceed even in light rain, and wind velocity sensor 5 is used to identify wind velocity limits for spraying established by the manufacturer.

Novel algorithms are required in SRC 8 to process the weather data from sensors 3, 4, and 5, and utilize the data in a spray process. For example, it is necessary to separate the velocity of vehicle 1 from the wind velocity while the spraying is in process. Vehicle position and speed information provided by GPS receiver 24 is combined with the data from wind velocity sensor 4 to determine the wind velocity effect on the spraying process in real-time.

A set of novel algorithms are required in the SRC 8 to process and integrate the vehicle local weather data from sensors 3, 4, 5, the vehicle geographical position from GPS receiver 24, the real-time measurement and control of insecticide particle size from analyzer 12 and concentration and the specific spray trip control data from instructions 27.

The digital memory SRC 8 has in (pre-trip preparation) been loaded with trip instructions 27 for the geographical areas to be sprayed. For each area, the trip instructions 27 provide the geographical spray start and stop positions, the speed limits while spraying, required insecticide particle size, required insecticide concentration, wind velocity and direction limits, temperature and humidity limits for spraying and the type of insecticide to be sprayed. Note that the trip instructions 27 will significantly vary for each area dependent upon the composition of the area (i.e., swamp or city street) and other local spray restrictions.

Per FIG. 2, the GPS receiver 24 upon SRC 8 command (every 2 seconds) provides position data and vehicle speed 28 to the SRC. The SRC 8 then compares the GPS position information for each spray area's geographical start and stop position and uses this unique information to obtain from SRC memory, the trip instructions that apply to the vehicle's current position.

Refer to FIG. 4 for a diagram of the novel algorithm to control the spray process at an area designated as Area X.

FIG. 4 shows the GPS processed position data 28 is compared every 2 seconds with the Area X specified position. If in agreement, for the start position for Area X, the SRC 8 immediately initializes the parameters 30 for the Area X and enters the spray process loop control algorithm 31. The spray process algorithm uses the initialization data 30 to set the insecticide particle size 37, insecticide flow rate (concentration) 38, the vehicle speed limits 36, and prior to spraying accepts and verifies that the vehicle local weather conditions 32 are within trip specifications.

While in the spray process loop algorithm 31, the SRC 8 accepts data from the GPS equipment 28, weather instrument 32, the flow rate sensor 33, particle size measurement 34 and processes this data to determine if any spray control changes are required. If spray control changes are required, the SRC spray process loop 31 can (as discussed in FIG. 2) vary the particle size 36, the flow rate 35 or turn on an alarm to control spray process speed.

Further, if the weather conditions change such that trip instructions are violated or if insecticide particle size or flow rate are not controllable (possibly due to equipment failure), the spray process algorithm stops the spray process and informs the operator of the problem.

Also shown on FIG. 2, RS-232 duplex communications link 25 to the SRC 8 enables management to input spray process decisions for particle size, insecticide concentration limits, geographical information for a particular spray area and weather control. This information is combined with the spray control algorithms in SRC 8 to control the spray process and to inform the driver of vehicle 1 in real-time of the spray process variables.

RS-232 duplex communications 25 also provides a detailed report on the results of a particular spray process (referred to as a spray trip report). It is expected management will provide a computer processing system to accept a detailed report on all variables in the spray process such as insecticide usage, estimated insecticide concentration at selected geographical positions, weather conditions during the spray process, start and stop time periods of spraying, and so forth. This information is then available to automatically generate instructions for the next spray trip in a particular area. Spray trip reports were available to the mosquito control industry prior to 1990 in the previously noted PRO-FLO system, invented by H. Starr.

Figure 3:
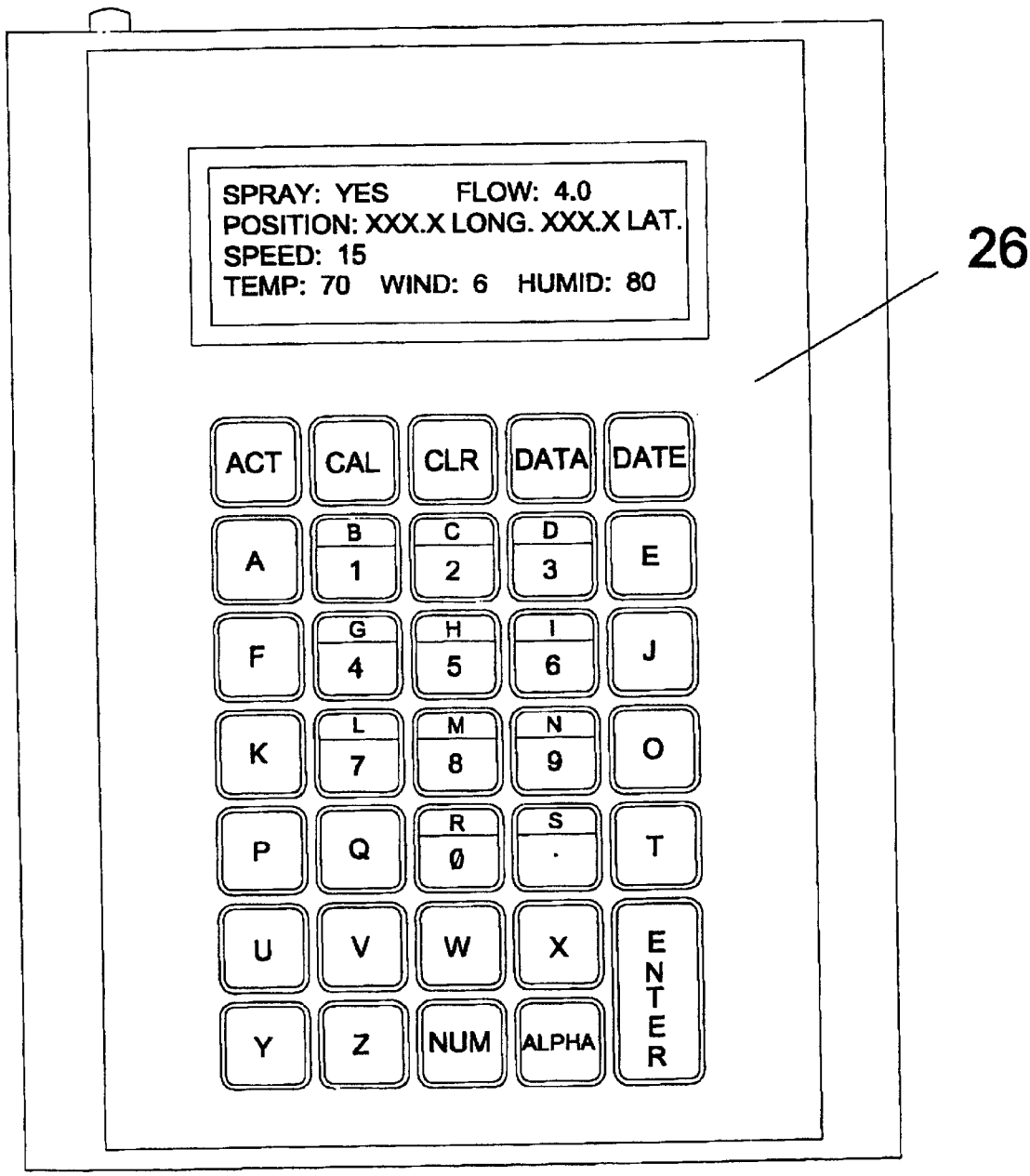
FIG. 3 is a drawing of the SRC front panel of FIG. 2, showing the operator keyboard and display interfaces.

Refer to FIG. 3 for display and keyboard 28 used with SRC 8. The information on the display 28 provides fluid flow rate, vehicle speed, position, and weather data, and indicates if the spray is off or on since the spray may be turned off (e.g.; at a particular location). It should be noticed that if the spray is off, the vehicle is moving, and the spray process enabled then an audible alarm would also be sounded to alert the driver.

This concludes the description of the preferred embodiments. A reading by those skilled in the art will bring to mind various changes without departing from the spirit and scope of the invention. It is intended, however, that the invention only be limited by the following appended claims.

We claim:

1. A spray system for mounting with a prime mover to dispense a mosquito insecticide fog, the system comprising:
   a nozzle;
   means for delivering an insecticide liquid to the nozzle;
   means for producing an air volume through the nozzle to entrain the insecticide liquid as particles in an air stream passing out of the nozzle; and
   means for controlling the air volume through the nozzle responsive to the size of the particles in the air stream.

2. The spray system recited in claim 1, further comprising means for varying the quantity of insecticide liquid delivered to the nozzle responsive to the speed of the prime mover.

3. The spray system recited in claim 2, wherein the liquid varying means comprises a low-volume pump, a flow sensor for detecting an output from the pump, and an electronic controller for controlling flow from the pump.

4. The spray system recited in claim 2, further comprising means for sensing and recording the rate of liquid delivery to the nozzle, a total of liquid delivery, location of the vehicle, a speed of the prime mover, mileage of the prime mover, weather conditions, and an estimate of liquid concentration at spray locations.

5. The spray system recited in claim 4, wherein the means for sensing a location of the prime mover comprises a Global Position System receiver and antenna.

6. The spray system recited in claim 5, wherein the means for sensing the prime mover location provides inputs to an electronic controller with algorithms to control changes in spray concentration or status at selected position locations.

7. The spray system recited in claim 4, wherein the means for measuring the speed of the rime mover comprises a Global position System receiver and antenna.

8. The spray system recited in claim 4, wherein the means for sensing the weather conditions at the prime mover comprises a temperature sensor, a humidity sensor and wind velocity sensor mounted on the vehicle.

9. The spray system recited in claim 4, wherein the recording means comprises electronic data storage.

10. The spray system recited in claim 1, wherein the controlling means comprises means responsive to weather conditions at the prime mover.

11. The spray system recited in claim 10, wherein the means responsive to weather conditions at the prime mover as part of the spray process control comprises a temperature sensor, a humidity sensor and a wind velocity sensor in communication with an electronic controlling means.

12. The spray system recited in claim 11, wherein the means responsive to weather conditions at the prime mover further comprises electronic controller algorithms for comparing the data from the weather sensors against set limits to determine if a spray process should continue, be stopped or modified.

13. The spray system recited in claim 1, wherein the air volume controlling means comprises a particle detector and means for receiving an output from the particle detector and controlling the air volume responsive to predetermined criteria as a function of the particle detector output.

14. The spray system recited in claim 13, wherein the controlling means comprises means for comparing a desired particle size to the detected particle size.

15. The spray system recited in claim 14, wherein the controlling means comprises algorithms for determining the desired particle size.

16. The spray system recited in claim 13, wherein the controlling means accepts over an RS-232 link, spray control data for weather limits, liquid concentration limits at geographical locations, speed limits, and particle size requirements for various insecticide liquids.

17. A mobile, real-time, closed-loop system for delivering an aerosol insecticide spray to a treatment area of time, the system comprising:
   a prime mover for moving through the treatment area during the treatment period;
   means mounted on the prime mover for producing an aerosol spray of the insecticide at the treatment area during the treatment period of time;
   means mounted on the prime mover for sensing real-time weather conditions and providing and electronic output representative thereof;
   means mounted on the prime mover for measuring the real-time size of insecticide particles in the aerosol spray and providing an electronic output representative thereof; and
   an electronic controller for receiving the electronic outputs from the weather conditions sensing means and the particle size for measuring means and providing electronic control signals; and
   means mounted on the prime mover for receiving the control signals from the electronic controller to regulate one or both of the amount of insecticide or the particle size.

18. A spray system for mounting with a prime mover to dispense an insect spray, the system comprising:
   a nozzle;
   means for delivering an insecticide liquid to the nozzle;
   means for producing an air volume through the nozzle to entrain the insecticide liquid as particles in an air stream passing out of the nozzle for producing an aerosol spray of the insecticide liquid at a treatment area during a treatment period of time; and
   means for controlling the aerosol spray through the nozzle responsive to the size of the particles in the air stream.

19. The system recited in claim 18, wherein the controlling means comprises means for controlling the spray responsive to weather conditions at the treatment area during the treatment period.

20. The system red claim 19, wherein the weather conditions comprise at least one of wind speed, wind direction, temperature and humidity.

21. The system recited in claim 18, wherein the means for controlling the aerosol spray is responsive to the real-time size of insecticide particles in the aerosol spray during the treatment period.

22. The system recited in claim 21, wherein the means for controlling the aerosol spray comprises;
   a particle detector positioned to measure the size of insecticide particles in the spray; and
   means for receiving an output from the particle detector and providing an input representative thereof.

23. The system recited in claim 21, wherein the means for controlling the aerosol spray comprises means for comparing a desired particle size to the detected particle size.

24. The system recited in claim 18, further comprising a prime mover for moving the spray system through the treatment area during the treatment period.

25. The system recited in claim 24 further comprising means mounted on the prime mover for sensing the weather conditions and providing an electronic output representative thereof.

26. The system recited in claim 24, further comprising an electronic controller for receiving the electronic output control signals to the means for controlling the aerosol spray.

* * * * *